United States Patent
Lee et al.

(10) Patent No.: US 7,690,962 B2
(45) Date of Patent: Apr. 6, 2010

(54) LIQUID CRYSTAL DISPLAY DEVICE BONDING APPARATUS AND METHOD OF USING THE SAME

(75) Inventors: Sang Seok Lee, Taegu-kwangyokshi (KR); Sang Ho Park, Pusan-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 358 days.

(21) Appl. No.: 11/808,748

(22) Filed: Jun. 12, 2007

(65) Prior Publication Data
US 2008/0030669 A1 Feb. 7, 2008

Related U.S. Application Data

(62) Division of application No. 10/308,156, filed on Dec. 3, 2002, now Pat. No. 7,244,160.

(30) Foreign Application Priority Data

Mar. 23, 2002 (KR) ............... 10-2002-0015876
Mar. 23, 2002 (KR) ............... 10-2002-0015877

(51) Int. Cl.
 *H01J 9/00* (2006.01)
 *G02F 1/13* (2006.01)
(52) U.S. Cl. ................ 445/26; 445/66; 349/187; 349/190
(58) Field of Classification Search ........... 445/24–25, 445/66; 349/187–190; 156/145
See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | ............ 29/592 |
| 4,653,864 A | 3/1987 | Baron et al. | |
| 4,691,995 A | 9/1987 | Yamazaki et al. | ........... 350/331 |
| 4,775,225 A | 10/1988 | Tsuboyama et al. | |
| 5,247,377 A | 9/1993 | Omeis et al. | ............ 359/76 |
| 5,263,888 A | 11/1993 | Ishihara et al. | |
| 5,379,139 A | 1/1995 | Sato et al. | |
| 5,406,989 A | 4/1995 | Abe | |
| 5,407,519 A | 4/1995 | Joffe et al. | |
| 5,499,128 A | 3/1996 | Hasegawa et al. | |
| 5,507,323 A | 4/1996 | Abe | |
| 5,511,591 A | 4/1996 | Abe | ............ 141/7 |
| 5,539,545 A | 7/1996 | Shimizu et al. | |
| 5,548,429 A | 8/1996 | Tsujita | |
| 5,642,214 A | 6/1997 | Ishii et al. | ............ 349/96 |
| 5,680,189 A | 10/1997 | Shimizu et al. | |
| 5,742,370 A | 4/1998 | Kim et al. | ............ 349/124 |
| 5,757,451 A | 5/1998 | Miyazaki et al. | |

(Continued)

FOREIGN PATENT DOCUMENTS

EP 1 003 066 5/2000

(Continued)

*Primary Examiner*—Nimeshkumar D Patel
*Assistant Examiner*—Anne M Hines
(74) *Attorney, Agent, or Firm*—McKenna Long & Aldridge LLP

(57) ABSTRACT

A liquid crystal display device bonding apparatus includes a chamber part for bonding substrates together, a plurality of moving elements within the chamber part, and at least one origin verifying system provided along moving paths of the moving elements.

10 Claims, 14 Drawing Sheets

U.S. PATENT DOCUMENTS

| | | | |
|---|---|---|---|
| 5,852,484 | A | 12/1998 | Inoue et al. |
| 5,854,664 | A | 12/1998 | Inoue et al. |
| 5,855,637 | A | 1/1999 | Yakou et al. |
| 5,861,932 | A | 1/1999 | Inata et al. |
| 5,875,922 | A | 3/1999 | Chastine et al. ............... 222/1 |
| 5,952,676 | A | 9/1999 | Sato et al. |
| 5,956,112 | A | 9/1999 | Fujimori et al. |
| 6,001,203 | A | 12/1999 | Yamada et al. |
| 6,011,609 | A | 1/2000 | Kato et al. ................ 349/190 |
| 6,016,178 | A | 1/2000 | Kataoka et al. ............ 349/117 |
| 6,016,181 | A | 1/2000 | Shimada |
| 6,055,035 | A | 4/2000 | von Gutfeld et al. ........ 349/187 |
| 6,163,357 | A | 12/2000 | Nakamura ................ 349/155 |
| 6,219,126 | B1 | 4/2001 | Von Gutfeld |
| 6,226,067 | B1 | 5/2001 | Nishiguchi et al. .......... 349/155 |
| 6,236,445 | B1 | 5/2001 | Foschaar et al. |
| 6,304,306 | B1 | 10/2001 | Shiomi et al. ................ 349/88 |
| 6,304,311 | B1 | 10/2001 | Egami et al. ............... 349/189 |
| 6,337,730 | B1 | 1/2002 | Ozaki et al. |
| 6,414,733 | B1 | 7/2002 | Ishikawa et al. ............ 349/110 |
| 2001/0021000 | A1 | 9/2001 | Egami |
| 2003/0147038 | A1 | 8/2003 | Lee et al. |
| 2003/0174274 | A1 | 9/2003 | Lee et al. |
| 2003/0226633 | A1 | 12/2003 | Muramoto et al. |

FOREIGN PATENT DOCUMENTS

| | | |
|---|---|---|
| JP | 51-065656 | 6/1976 |
| JP | 57-38414 | 3/1982 |
| JP | 57-88428 | 6/1982 |
| JP | 58-27126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | S62-054225 | 3/1987 |
| JP | S62-054228 | 3/1987 |
| JP | S62-054229 | 3/1987 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 5-127179 | 5/1993 |
| JP | 05-154923 | 6/1993 |
| JP | 5-265011 | 10/1993 |
| JP | 5-281557 | 10/1993 |
| JP | 5-281562 | 10/1993 |
| JP | H06-018829 | 1/1994 |
| JP | 6-51256 | 2/1994 |
| JP | H06-064229 | 3/1994 |
| JP | 6-148657 | 5/1994 |
| JP | 6-160871 | 6/1994 |
| JP | H06-194637 | 7/1994 |
| JP | 06-235925 | 8/1994 |
| JP | 6-265915 | 9/1994 |
| JP | 06-313870 | 11/1994 |
| JP | 07-084268 | 3/1995 |
| JP | 7-128674 | 5/1995 |
| JP | 7-181507 | 7/1995 |
| JP | H07-275770 | 10/1995 |
| JP | H07-275771 | 10/1995 |
| JP | H08-076133 | 3/1996 |
| JP | 8-95066 | 4/1996 |
| JP | 08-101395 | 4/1996 |
| JP | 8-106101 | 4/1996 |
| JP | H08-110504 | 4/1996 |
| JP | H08-136937 | 5/1996 |
| JP | 8-171094 | 7/1996 |
| JP | 8-190099 | 7/1996 |
| JP | H08-173874 | 7/1996 |
| JP | 8-240807 | 9/1996 |
| JP | 9-5762 | 1/1997 |
| JP | 9-26578 | 1/1997 |
| JP | H09-001026 | 1/1997 |
| JP | 09-61829 | 3/1997 |
| JP | 9-73075 | 3/1997 |
| JP | 9-73096 | 3/1997 |
| JP | H09-094500 | 4/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-002879 | 1/2000 |
| JP | 2000-29035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-0193988 | 7/2000 |
| JP | 2000-0241824 | 9/2000 |
| JP | 2000-0284295 | 10/2000 |
| JP | 2000-0292799 | 10/2000 |
| JP | 2000-0310759 | 11/2000 |
| JP | 2000-0310784 | 11/2000 |
| JP | 2000-0338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |

| | | | | | |
|---|---|---|---|---|---|
| JP | 2001-166272 | 6/2001 | JP | 2002-131762 | 5/2002 |
| JP | 2001-166310 | 6/2001 | JP | 2002-139734 | 5/2002 |
| JP | 2001-183683 | 7/2001 | JP | 2002-156518 | 5/2002 |
| JP | 2001-201750 | 7/2001 | JP | 2002-169166 | 6/2002 |
| JP | 2001-209052 | 8/2001 | JP | 2002-169167 | 6/2002 |
| JP | 2001-209056 | 8/2001 | JP | 2002-182222 | 6/2002 |
| JP | 2001-209057 | 8/2001 | JP | 2002-202512 | 7/2002 |
| JP | 2001-209058 | 8/2001 | JP | 2002-202514 | 7/2002 |
| JP | 2001-209060 | 8/2001 | JP | 2002-214626 | 7/2002 |
| JP | 2001-222017 | 8/2001 | JP | 2002-229042 | 8/2002 |
| JP | 2001-235758 | 8/2001 | JP | 2002-236276 | 8/2002 |
| JP | 2001-255542 | 9/2001 | JP | 2002-258299 | 8/2002 |
| JP | 2001-264782 | 9/2001 | JP | 2002-236292 | 9/2002 |
| JP | 2001-272640 | 10/2001 | JP | 2002-277865 | 9/2002 |
| JP | 2001-281675 | 10/2001 | JP | 2002-277866 | 9/2002 |
| JP | 2001-281678 | 10/2001 | JP | 2002-277881 | 9/2002 |
| JP | 2001-282126 | 10/2001 | JP | 2002-287156 | 10/2002 |
| JP | 2001-305563 | 10/2001 | JP | 2002-296605 | 10/2002 |
| JP | 2001-330837 | 11/2001 | JP | 2002-311438 | 10/2002 |
| JP | 2001-330840 | 11/2001 | JP | 2002-311440 | 10/2002 |
| JP | 2001-356353 | 12/2001 | JP | 2002-311442 | 10/2002 |
| JP | 2001-356354 | 12/2001 | JP | 2002-323687 | 11/2002 |
| JP | 2002-14360 | 1/2002 | JP | 2002-323694 | 11/2002 |
| JP | 2002-23176 | 1/2002 | JP | 2002-333628 | 11/2002 |
| JP | 2002-49045 | 2/2002 | JP | 2002-333635 | 11/2002 |
| JP | 2002-079160 | 3/2002 | JP | 2002-333843 | 11/2002 |
| JP | 2002-080321 | 3/2002 | JP | 2002-341329 | 11/2002 |
| JP | 2002-82340 | 3/2002 | JP | 2002-341355 | 11/2002 |
| JP | 2002-90759 | 3/2002 | JP | 2002-341356 | 11/2002 |
| JP | 2002-90760 | 3/2002 | JP | 2002-341357 | 11/2002 |
| JP | 2002-107740 | 4/2002 | JP | 2002-341358 | 11/2002 |
| JP | 2002-122870 | 4/2002 | JP | 2002-341359 | 11/2002 |
| JP | 2002-122872 | 4/2002 | JP | 2002-341362 | 11/2002 |
| JP | 2002-122873 | 4/2002 | KR | 2000-0035302 | 6/2000 |

LIQUID CRYSTAL DISPLAY DEVICE BONDING APPARATUS AND METHOD OF USING THE SAME

This application is a Divisional of prior application Ser. No. 10/308,156, filed Dec. 3, 2002, now U.S. Pat. No. 7,244, 160 which claims the benefit of Korean Patent Application Nos. P2002-0015876 and P2002-0015877, both filed in Korea on Mar. 23, 2002, which are hereby incorporated by reference in their entirety as if fully set forth herein.

BACKGROUND OF THE INVENTION

1. Field of the Invention

The present invention relates to a liquid crystal display, and more particularly, to a liquid crystal display (LCD) bonding apparatus and method for fabrication of large-sized LCDs using a liquid crystal dropping method applied thereto.

2. Background of the Related Art

In general, as demands for various types of display devices increases, different flat display panels, such as liquid crystal display (LCD), plasma display panel (PDP), electro-luminescent display (ELD), and vacuum fluorescent display (VFD) devices are currently being developed for deployment as display device in various apparatus. Of these different flat display panel devices, the LCDs have been commonly used as portable display devices, and are replacing the cathode ray tube (CRT) because of their excellent picture quality, light weight, thin profile, and low power consumption. In addition, the mobile type LCDs, such as monitors for notebook computers, are presently being developed for televisions and monitors of computers.

Despite various technical developments of the LCD devices, enhancement of picture quality are inconsistent with the features and advantages of the LCD. Accordingly, key development of the LCD device relies on implementation of high picture quality (i.e., high definition), high luminance, and large-sized screen while maintaining its light weight, thin profile, and low power consumption.

The LCD device is commonly provided with a liquid crystal panel for displaying an image, and a driving part for providing a driving signal to the liquid crystal panel. The liquid crystal panel includes a TFT array substrate and a color filter substrate that are bonded together with a gap between the substrates, and a liquid crystal material layer injected within the gap.

On the TFT array substrate, there are a plurality of gate lines arranged along a first direction at fixed intervals, a plurality of data lines arranged along a second direction at fixed intervals perpendicular to the gate lines, a plurality of pixel electrodes disposed in pixel regions defined at crossed points of the gate and data lines to form a matrix, a plurality of thin film transistors switchable in response to a signal applied to the gate lines for transmission of a signal transmitted along the data line to the pixel electrodes.

On the color filter substrate, there is a black matrix layer for shielding light from portions of the color filter substrate excluding the pixel regions, a red (R), green (G), and blue (B) color filter layer for converting white light into colored light, and a common electrode for generating an applied electric field.

The LCD device may be fabricated by a known liquid crystal injection method in which sealant is patterned on one of the TFT and color filter substrates with an injection hole formed thereon, bonding the substrates under a reduced pressure (i.e., a vacuum), and injecting the liquid crystal material through the injection hole in the sealant. Alternatively, LCD devices may be fabricated by a known liquid crystal dropping method, as disclosed in a Japanese laid-open patent publication Nos. H11-089612, and H11-172903. In the liquid crystal dropping method, a first substrate having the liquid crystal material dropped thereon and a second substrate are bonded together in a vacuum chamber. However, the LCD device fabricating method having the liquid crystal injection method applied thereto requires a substantial amount of processing time period for injection of the liquid crystal material. For example, since the liquid crystal material is injected through capillary action under a vacuum, the liquid crystal material injection is not favorable for fabrication of large-sized LCD devices and for mass production. In contrast, the liquid crystal fabricating method using the liquid crystal dropping method does not require injection processing, thereby reducing a total amount of processing time.

FIG. 1 is a cross sectional view of a liquid crystal display device bonding apparatus during loading according to the related art. In FIG. 1, the liquid crystal display device bonding apparatus includes a frame 10, an upper stage 21, a lower stage 22, a sealant dispenser (not shown), a liquid crystal dispenser 30, an upper chamber part 31, a lower chamber part 32, chamber moving system 40, a capture system 61-64, and a stage moving system 50.

The lower stage 22, sealant dispenser (not shown), and liquid crystal dispenser 30 are disposed along a side of the frame, and the upper and lower chamber parts 31 and 32 are separated. Accordingly, once a lower substrate 51 has been placed onto the lower stage 22 and the liquid crystal material and sealant are deposited onto the lower substrate 51, the lower chamber part 32 is moved beneath the upper chamber part 31 via the stage moving system 40 prior to bonding.

FIG. 2 is a cross sectional view of the liquid crystal display device bonding apparatus of FIG. 1 during bonding according to the related art. In FIG. 2, the lower chamber part 32 is positioned beneath the upper chamber part 31, and the upper and lower chamber parts 31 and 32 are connected together. The capture system includes the rotating shaft 61, the rotating actuator 63, the elevating actuator 64, and the supporting plate 62 for supporting a corner of the substrate. The capture system supports an upper substrate 52 to be temporarily held to the upper stage 21 at opposite diagonal positions thereof.

A method for fabricating an LCD device by using the substrate apparatus according to the related art will be explained in more detail during a fabrication process.

The upper substrate 52 is held at the upper stage 21, and the lower substrate 51 is held at the lower stage 22. Accordingly, the lower chamber part 32 having the lower stage 22 is moved to a location for processing a sealant coating and liquid crystal dropping by the chamber moving system 40 as shown in FIG. 1. Then, upon finishing the sealant coating and liquid crystal dropping onto the lower substrate 51 by the sealant dispenser (not shown) and liquid crystal dispenser 30, the lower chamber part 32 is moved beneath the upper chamber part 31 by the chamber moving system 40, as shown in FIG. 2. Next, assembly of the upper and lower chamber parts 31 and 32 is performed by the chamber moving system 40 to enclose a space where the upper and lower stages 21 and 22 are located. Then, the supporting plate 62 is brought to two corners of the upper substrate 52 held at the upper stage 31 as the elevating actuator 64 and the rotating actuator 63 of the capture system move.

FIG. 3 is a perspective view of a substrate supporting system of a liquid crystal display device bonding apparatus according to the related art. In FIG. 3, a suction force generated by a vacuum system (not shown) that holds the upper substrate 52 is released, thereby dropping the upper substrate 52 onto the supporting plates 62 of the capture system. In addition, the vacuum system (not shown) is used for reducing a pressure within the assembled upper and lower chamber parts 31 and 32. When the assembled upper and lower chamber parts 31 and 32 have achieved a desired vacuum, an electrostatic force is applied to the upper stage 31, thereby affixing the upper substrate 52 to the upper stage 21. Then, the rotating actuator 63 and the elevating actuator 64 of the capture system are driven, thereby moving the supporting plates 62 and the rotating shaft 61 out of the way.

During the period of the desired vacuum, the upper stage 21 is moved downward by the stage moving means 50 to press and bond the upper substrate 52 held at the upper stage 21 to the lower substrate 51 held at the lower stage 22, thereby completing fabrication of the LCD device.

During the fabrication process, as detailed above, many of the moving elements in the chamber part require substantial moving accuracy (i.e., the stages and the substrate supporting system) and also require substantial accurate position setting. The position setting of the moving elements is generally made during initial equipment installation, or after a predetermined operational time period. Accordingly, repeated manual position setting of the moving elements results in poor accuracy and requires significantly long periods of time. Moreover, the position setting of the moving elements cannot anticipate sudden occurrences of unexpected situations, such as power loss. For example, the controller of the bonding apparatus may only remember positions of respective moving elements as original positions at the moment power is restored, thereby resulting in inaccurate positioning of the moving elements.

SUMMARY OF THE INVENTION

Accordingly, the present invention is directed to a liquid crystal display (LCD) bonding apparatus and a method of using the bonding apparatus that substantially obviates one or more of the problems due to limitations and disadvantages of the related art.

An object of the present invention is to provide an LCD device bonding apparatus and method in which automatic position setting may be performed when an unexpected sudden situation occurs, or when position setting is required.

Another object of the present invention is to provide an LCD device bonding apparatus and method that can make precise original settings of moving elements for improving movement precision.

Another object of the present invention is to provide an LCD device bonding apparatus and method that can detect movement errors of the moving elements in advance.

Another object of the present invention is to provide an LCD device bonding apparatus and method in which movement correction of moving elements is automatically made by a precise mechanical structure.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device bonding apparatus includes a chamber part for bonding substrates together, a plurality of moving elements within the chamber part, and at least one origin verifying system provided along moving paths of the moving elements.

In another aspect, a method for setting an origin in an liquid crystal display device bonding apparatus includes moving a moving element toward an origin verifying system, reading a position of the moving element at a preset location, and resetting the preset location as an origin of the moving element when the moving element reaches the preset location.

In another aspect, a liquid crystal display device bonding apparatus includes a chamber part for bonding substrates together, at least one moving element within the chamber part, and at least one moving amount verifying system attached between at least one end along a moving path of the moving element.

In another aspect, a method for correcting a moving amount in a liquid crystal display device bonding apparatus includes moving a moving element from a first set point to a second set point, reading a moving distance of the moving element from the first set point to the second set point, comparing the read moving distance and a preset moving distance of the moving element for detecting an error between the read moving distance and the present moving distance, and correcting the moving distance of the moving element based upon the detected error.

In another aspect, a liquid crystal display device bonding apparatus includes a chamber part for bonding substrates together, at least one moving element within the chamber part, and at least one moving amount verifying system attached between at least one end along a moving path of the moving element.

In another aspect, a method for correcting a moving amount in a liquid crystal display device bonding apparatus includes moving a moving element from a first set point to a second set point, reading a moving distance of the moving element from the first set point to the second set point, comparing the read moving distance and a preset moving distance of the moving element for detecting an error between the read moving distance and the present moving distance, and correcting the moving distance of the moving element based upon the detected error.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
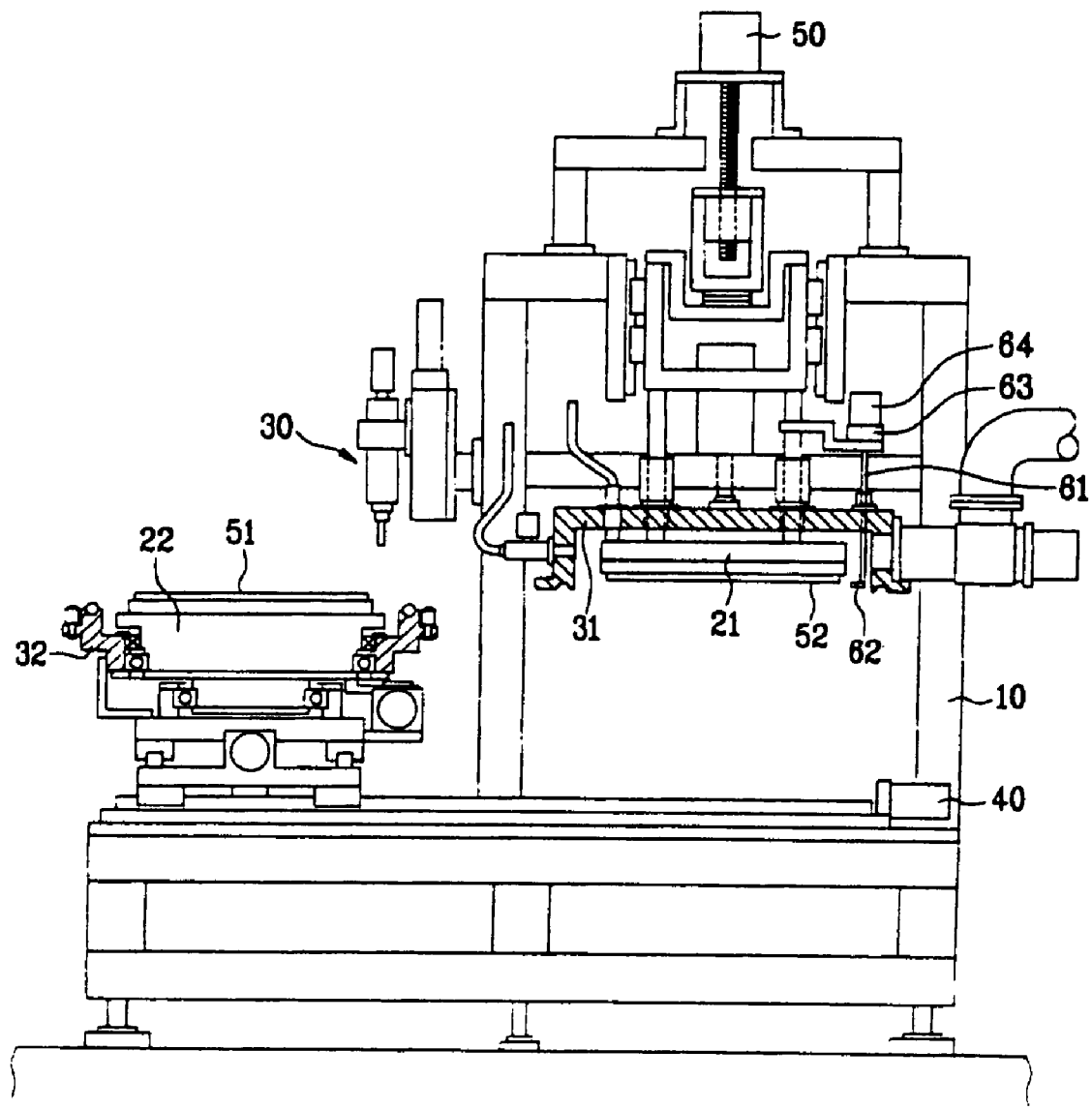
FIG. 1 is a cross sectional view of a liquid crystal display device bonding apparatus during loading according to the related art.
Figure 2:
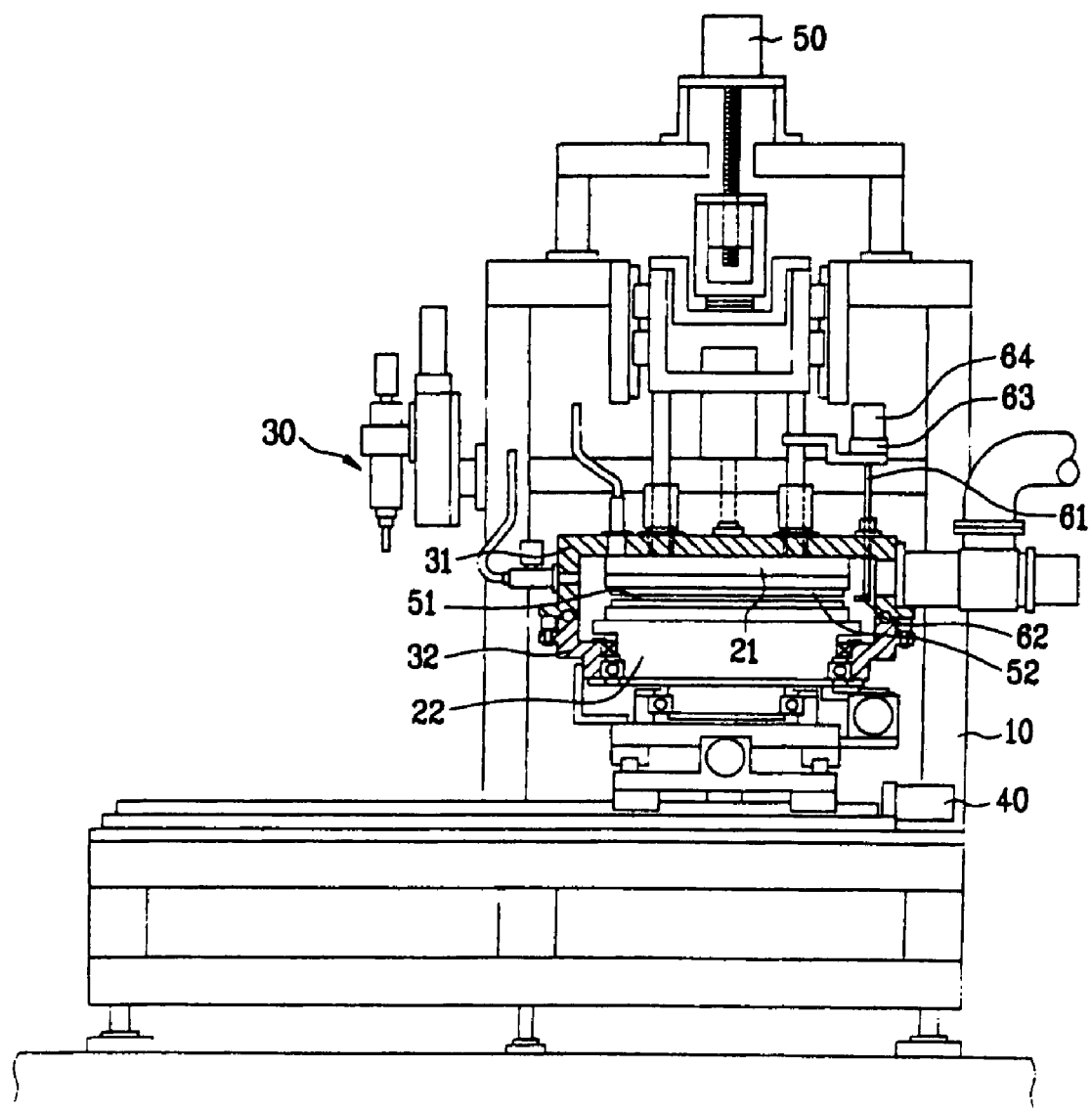
FIG. 2 is a cross sectional view of the liquid crystal display device bonding apparatus of FIG. 1 during bonding according to the related art.
Figure 3:
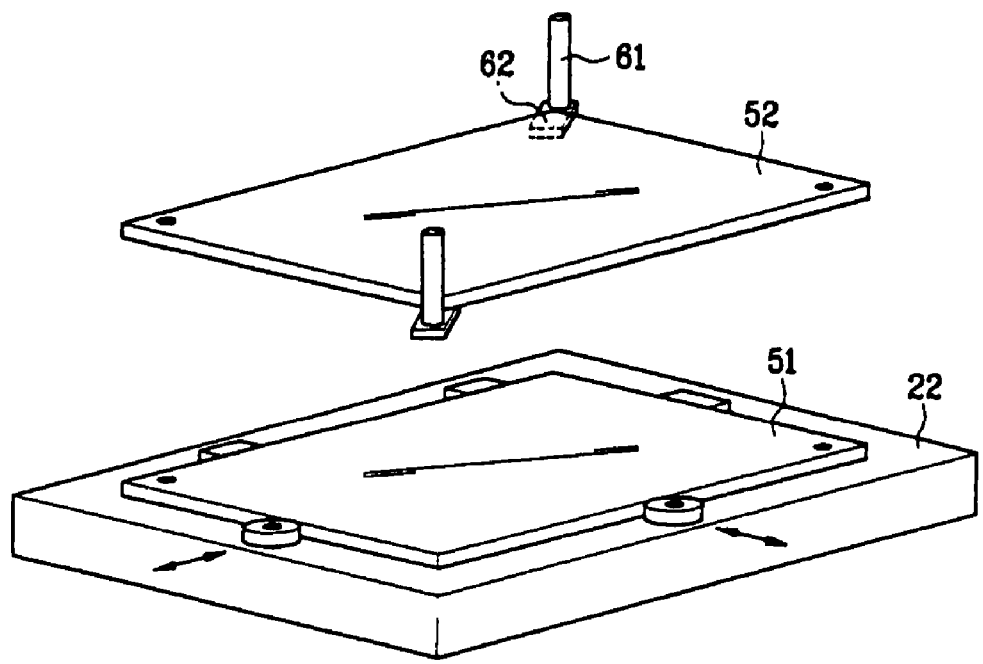
FIG. 3 is a perspective view of a substrate supporting system of a liquid crystal display device bonding apparatus according to the related art.
Figure 4:
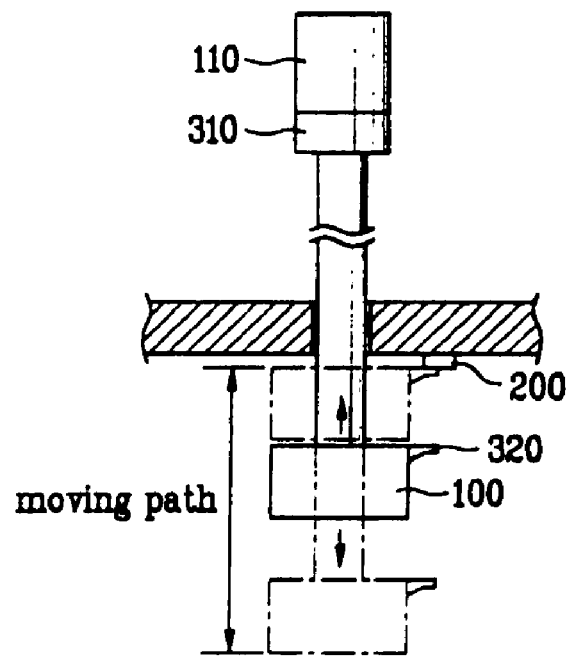
FIG. 4 is an exemplary structure for setting origins of moving elements in accordance with the present invention.

FIG. 4 is an exemplary structure for setting origins of moving elements in accordance with the present invention. In FIG. 4, the exemplary structure may include a contact part 200 for contacting a moving element 100, and a contact confirming system fitted to the moving element 100 for sensing contact to the contact part 200. The contact part 200 may be a stop block, and the contact confirming system may include a load cell 310 attached to a driving system 110 for the moving element 100, and a contact projection 320 attached to the moving element 100.

Figure 5A:
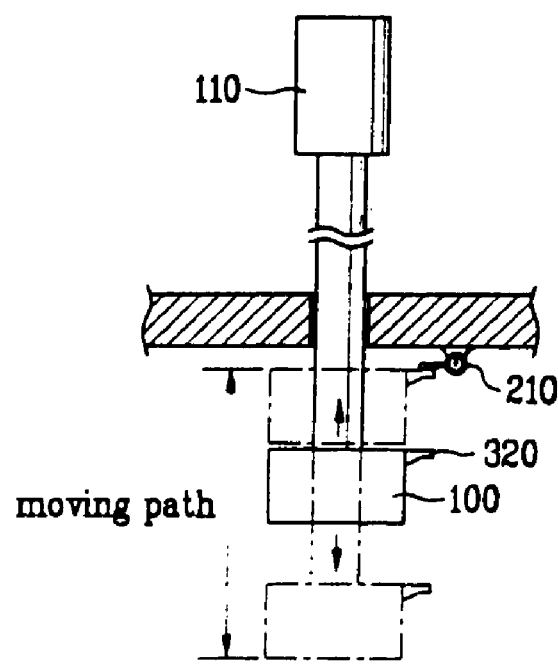
FIGS. 5A to 5C illustrate exemplary origin verifying systems for setting origins in accordance with the present invention.
Figure 5B:
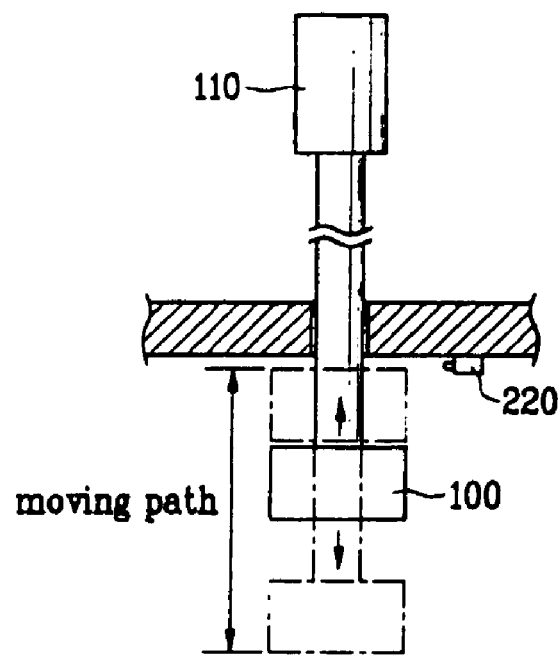
Figure 5C:
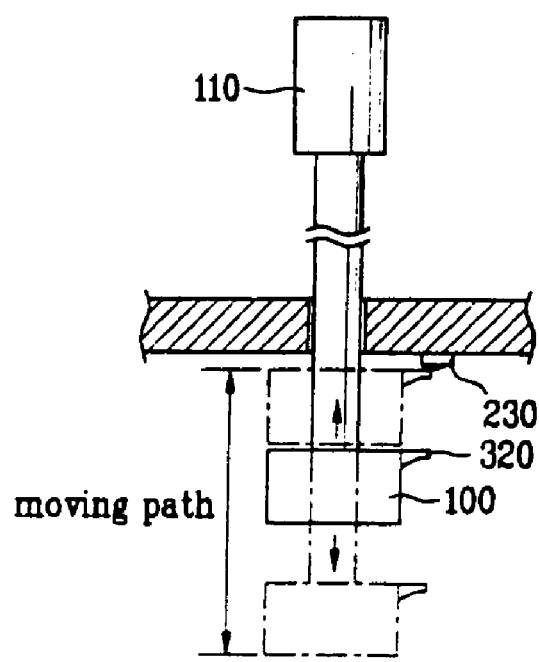

FIGS. 5A to 5C illustrate exemplary origin verifying systems for setting origins in accordance with the present invention. In FIG. 5A, an origin verifying system may include a dial gauge 210 for visual sensing of contact with the moving element 100. In FIG. 5B, an origin verifying system may include a position confirming sensor 220 for sensing and displaying a position of the moving element 100. In FIG. 5C, an origin verifying system may include a limit switch 230 for sensing a position of the moving element 100. Alternatively, the origin verifying system may be attached and include a number of gauges and/or sensors attached along every moving path of the moving elements. Moreover, the origin verifying system may be provided at overlapping regions of moving paths of the moving elements, or to moving paths of the moving elements as required.

Figure 6A:
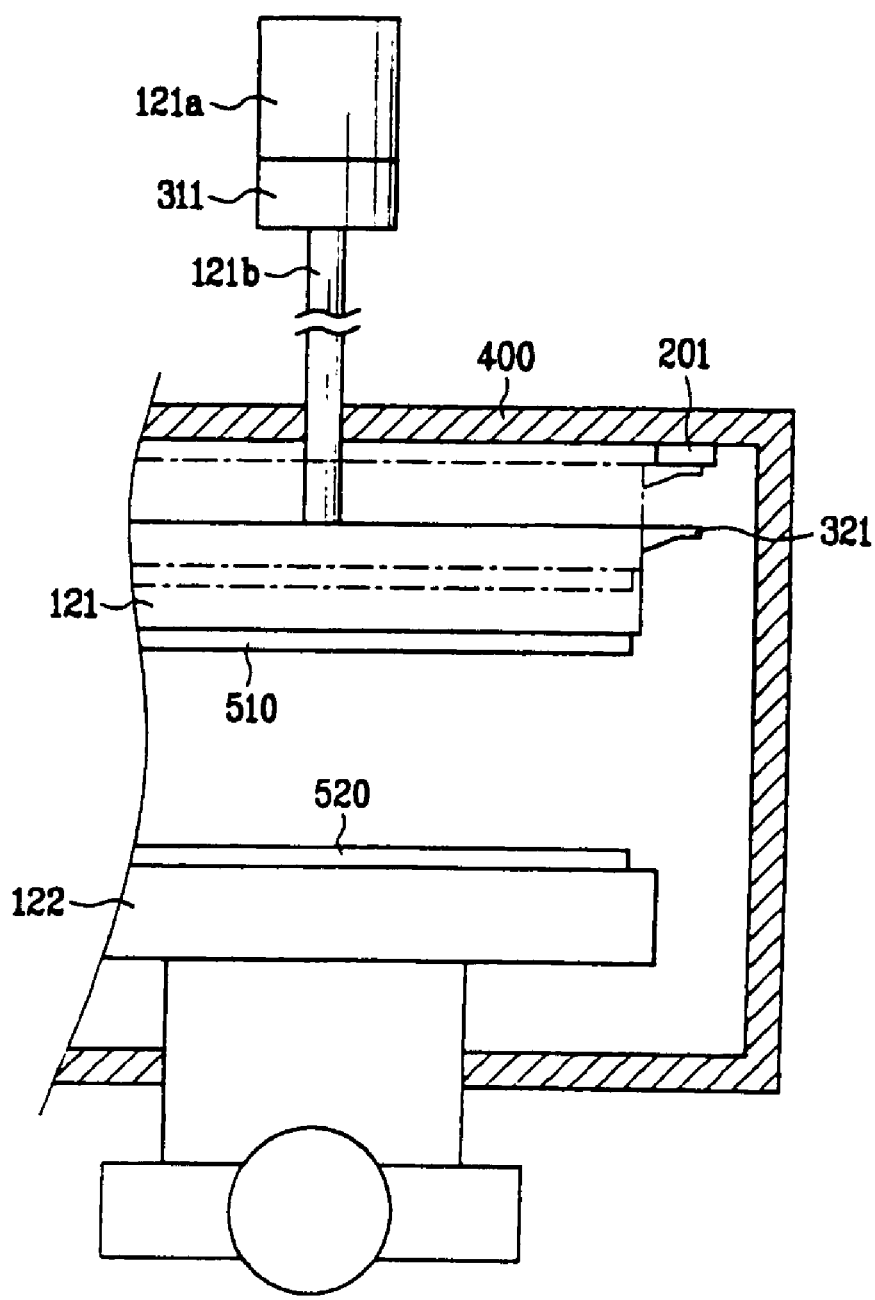
FIGS. 6A to 6B are exemplary origin setting states of an upper stage in accordance with the present invention.
Figure 6B:
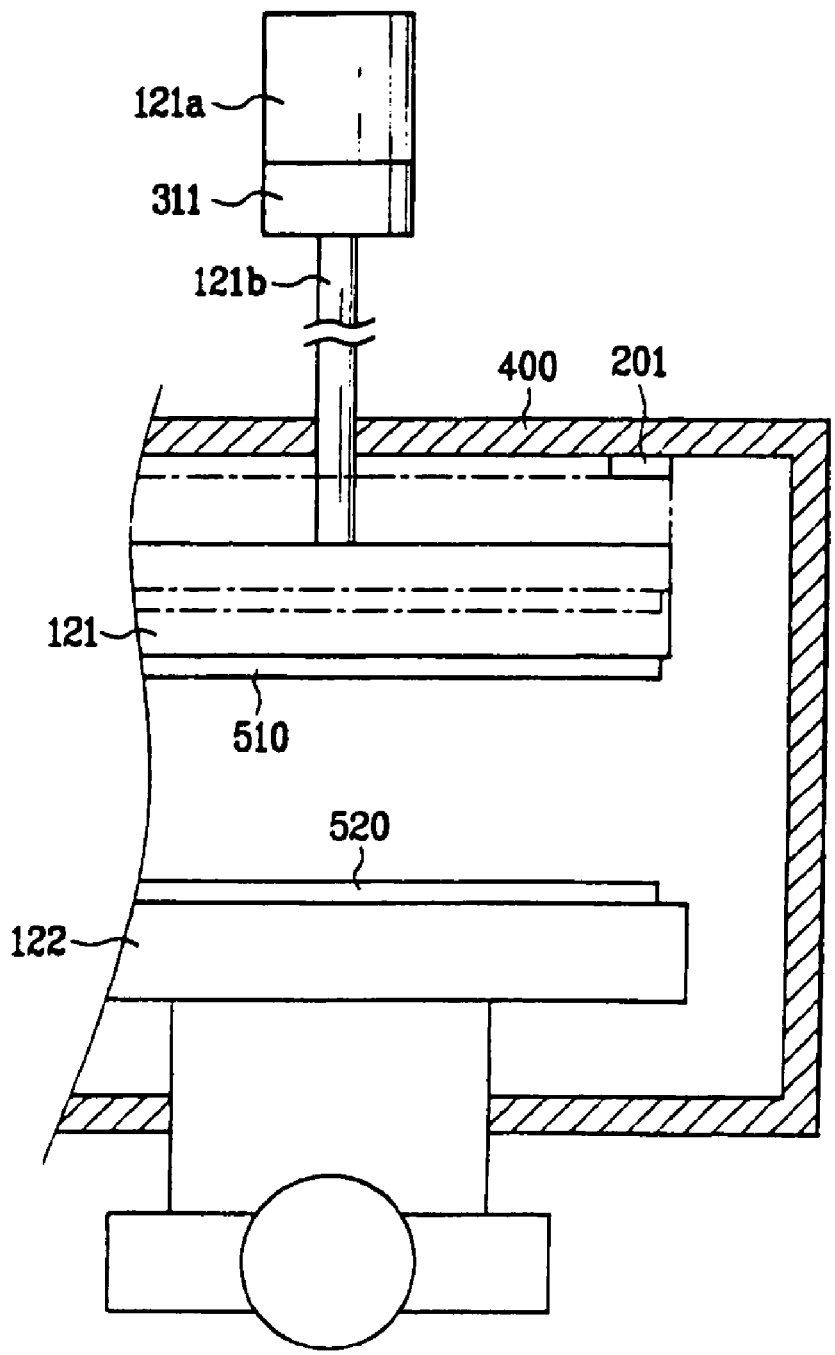

FIGS. 6A to 6B are exemplary origin setting states of an upper stage in accordance with the present invention. In FIG. 6A, different moving elements 100 (in FIGS. 4 and 5A-5C) may include an upper stage 121 and a lower stage 122 for loading and bonding upper and lower substrates 510 and 520 together, a substrate supporting system (not shown) for affixing the upper substrate 510 to the upper stage 121 during a vacuum affixing process, and a loading supporting system (not shown) for supporting the loading of the lower substrate 520 onto the lower stage 122. In addition, there may also be an alignment system (not shown) for aligning the upper substrate 510 onto the upper stage 121 and for aligning the lower substrate 520 onto the lower stage 122. Moreover, a clamping system may be provided for loading or affixing the upper and lower substrates 510 and 520 onto the upper and lower stages 121 and 122, respectively. Furthermore, additional process supporting systems may be provided for supporting various fabrication processes for bonding the upper and lower substrates 510 and 520 together.

Exemplary structures and methods for setting origins of the upper stage 121, the substrate supporting system (not shown), and the loading supporting system (not shown) will now be explained.

1. Structure and Method for Setting an Origin of the Upper Stage:

In FIG. 6A, a first contact part 201 may be located between a space substantially starting from a top surface of the lower stage 122 to a top surface of an inside of the chamber part 400, which is along a moving path of the upper stage 121, or at a part adjacent to the moving path of the upper stage 121. The first contact part 201 may project from a top surface of an inside of the chamber part 400, and from an end of the moving path of the lower stage 121 toward the upper stage 121. A first load cell 311 of the contact confirming part may be attached to a driving system 121a for moving the upper stage 121 along upward and downward directions. A first contact projection 321 of the contact confirming part may project from a side surface of the upper stage 121, such that the first contact projection 321 may be brought into contact with the first contact part 201 when the upper stage 121 moves to an uppermost position.

In FIG. 6B, the top surface of the upper stage 121 may serve as a contact projection when the first contact part 201 projects from an inside surface of the chamber part 400 toward the upper stage 121 along a moving path of the upper stage 121. Accordingly, no separate contact projection may be required. Alternatively, the first contact part 201 may be attached along a moving path of an elevating shaft 121b of the upper stage 121. Accordingly, the contact projection that contacts the first contact part 201 may be attached to a separate part that moves along with the upper stage 121. Thus, the first contact part may be attached to either, or both of the inside and outside of the chamber part 400.

An exemplary origin setting process of the upper stage 121 may include moving the upper stage 121 along the upward direction to contact the first contact part 201 of the origin verifying system. Accordingly, the driving system 121a moves the upper stage 121 along the upward direction until the first load cell 311 that is attached to the driving system 121a senses a load imparted by the upper stage 121. For example, when the first contact projection 321 contacts the first contact part 201, a tensile load is produced and measured by the first load cell 311. Thus, the first load cell 311 produces a signal indicating that the first contact projection 321 has contacted the first contact part 201.

As a result, movement of the upper stage 121 is stopped and a primary location of the upper stage 121 is determined. Then, by setting the primary location of the upper stage 121 to be the origin of the upper stage 121 by the controller, the origin setting of the upper stage 121 may be completed. Accordingly, moving distances of the upper stage 121 for process steps may also be reset and stored in the controller with reference to the origin setting. The foregoing steps may be carried out once, or for a preset number of times, or for a plurality of times until an origin error is within a tolerable range.

In FIG. 5A, during the above-detailed series of steps, if the dial gauge 210 is to read the position of the upper stage 121 at a preset point, a location of the upper stage 121 at a time that the indicator of the dial gauge 210 changes may be reset as the origin of the upper stage 121.

In FIG. 5B, during the above-detailed series of steps, if the position confirming sensor 220 is to read the position of the upper stage 121 to a preset point, the origin of the upper stage 121 is reset with reference to the signal sensed at the sensor 220 fitted to the present point.

In FIG. 5C, during the above-detailed series of steps, if the limit switch 230 is to read a position of the upper stage 121 to a preset point, a location of the upper stage 121 at a time a signal is produced from the limit switch 230 is reset as the origin of the upper stage 121.

Figure 7:
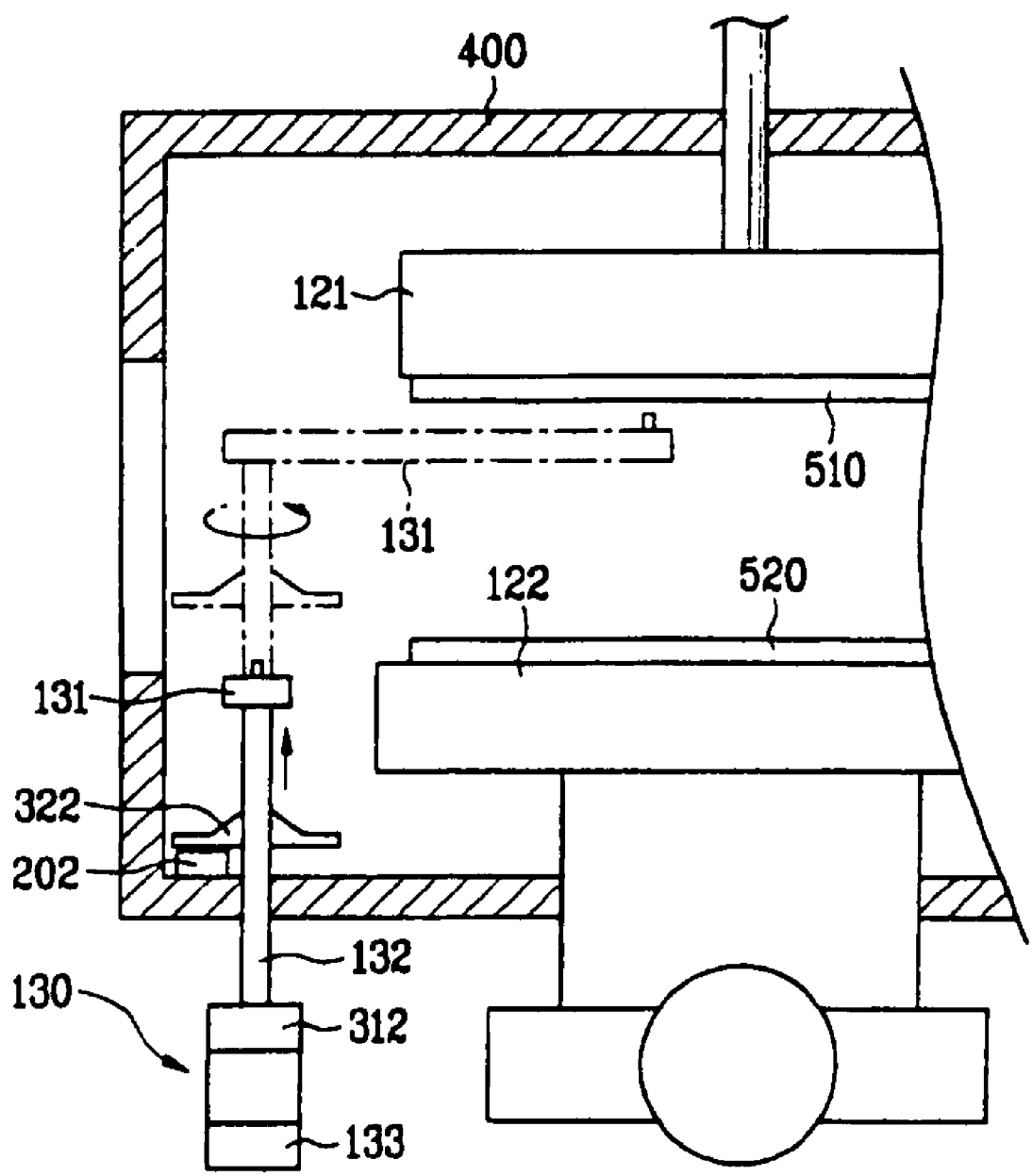
FIG. 7 is another exemplary origin setting state of a substrate supporting system in accordance with the present invention.

2. Structure and Method for Setting an Origin of the Substrate Supporting Means:

FIG. 7 is another exemplary origin setting state of a substrate supporting system in accordance with the present invention. In FIG. 7, a second contact part 202 of an origin verifying system of a substrate supporting system 130 may be attached between a bottom portion of an upper substrate 510 held at an upper stage 121 and a bottom portion of an inside of a chamber part 400, and along a moving path of a supporting part 131 of the supporting system 130. Alternatively, the second contact part 202 may be attached to a part adjacent to a moving path of the supporting part 131. The second contact part 202 may project from the bottom portion of the inside surface of the chamber part 400 at an end of the moving path of the supporting part 131 of the substrate supporting system 130.

A second contact projection 322 of the contact confirming part may project around a circumference of an elevating shaft 132 of the substrate supporting system 130, wherein the substrate supporting system 130 contacts the second contact part 202 when the substrate supporting system 130 is fully moved downward. Alternatively, the second contact projection 322 may be attached to the inside and outside of the chamber part 400, when the second contact part 202 may be attached to the inside or outside of the chamber part 400. Accordingly, a second load cell 312 of the contact confirming part of the origin verifying system may be attached to the driving system 133 that operates to move the substrate supporting system 130 along the upward and downward directions.

An origin setting method of the foregoing substrate supporting system may be the same as the series of steps carried out for origin setting of the upper stage, as explained before.

Figure 8:
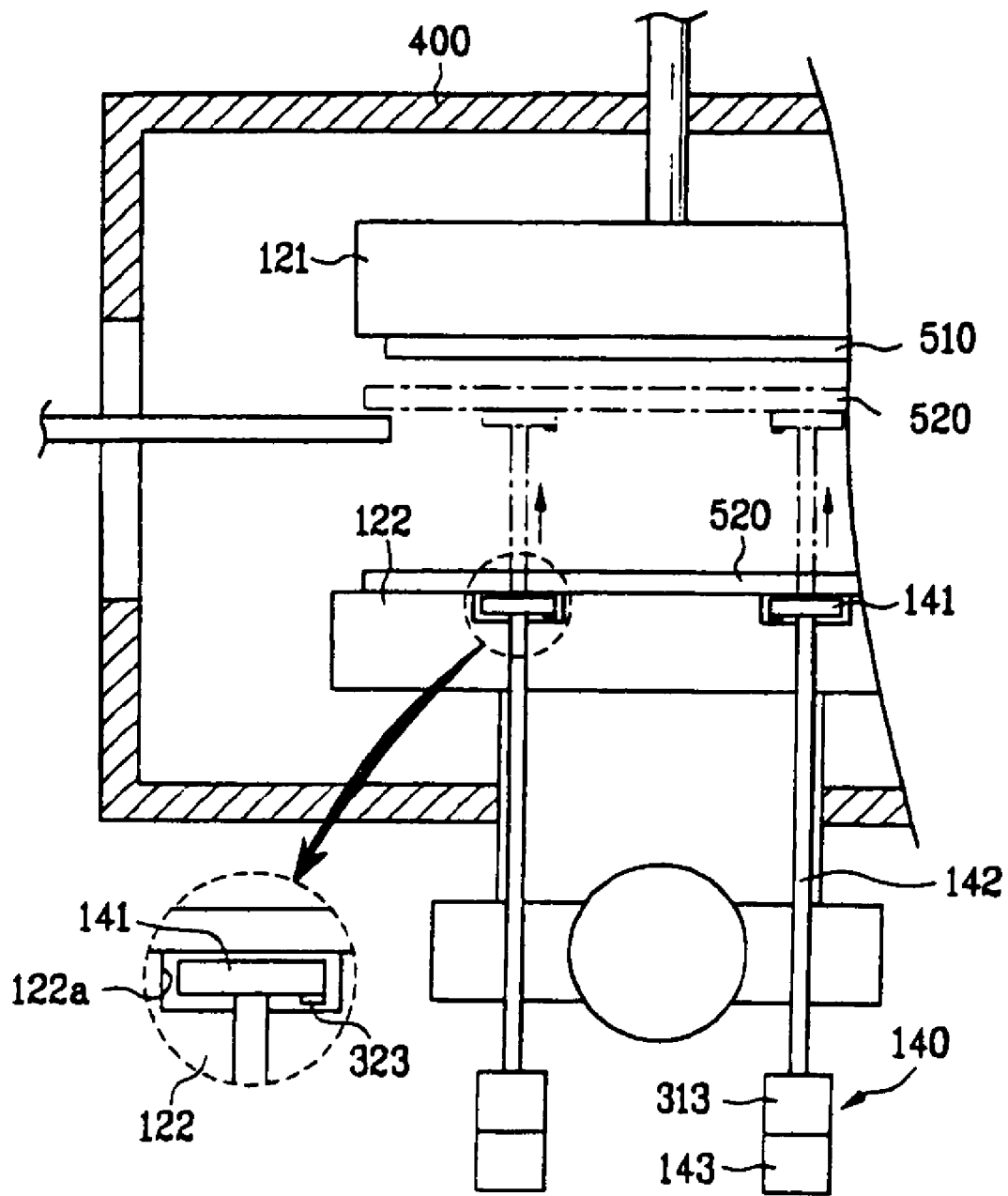
FIG. 8 is an exemplary origin setting state of a loading support system in accordance with the present invention.

3. Structure and Method for Setting an Origin of the Loading Supporting Means:

FIG. 8 is an exemplary origin setting state of a loading support system in accordance with the present invention. In FIG. 8, a contact part of an origin verifying system may be attached to a part substantially between an inside surface of a recess 122a in a lower stage 122. Alternatively, a contact part may be attached to a moving path of the supporting system 141 of the loading supporting system 140, or to a side of the lower stage 122 adjacent to the moving path of the loading supporting system 140. In particular, considering that the loading supporting system 140 may move along upward and downward directions within an inside of the lower stage 122, a system in which a bottom surface of the recess 122a of the lower stage 122 where the loading supporting system 140 is accommodated thereto may serve as the contact part. For example, though the bottom surface of the supporting system 141 of the loading supporting system 140 may serve as a contact projection of the contact confirming part of the origin verifying system, a third contact projection 323 may be attached to a bottom of the supporting part of the loading supporting system 140.

A third load cell 313 of the contact confirming part of the origin verifying system may be attached to a driving system 143 that moves along upward and downward directions of the loading supporting system 140. In addition, although not shown, a contact projection may be attached to a part of an elevating shaft 142 of the loading supporting system 140 outside of the chamber part 400, and the contact part may be attached in a vicinity of the contact projection for contacting the contact projection. For example, when the loading supporting system 140 is fully moved along the downward direction, contact of the bottom surface of the supporting part 141 of the loading supporting system 140 with the bottom of the recess 122a of the lower stage 122 is made, and the position of the supporting part may be reset as the origin.

An origin setting method of the foregoing loading supporting system may be identical with a series of steps carried out for setting the origin of the upper stage. Thus, the origin verifying system of the present invention facilitates simple origin setting of the different moving elements.

Figure 9:
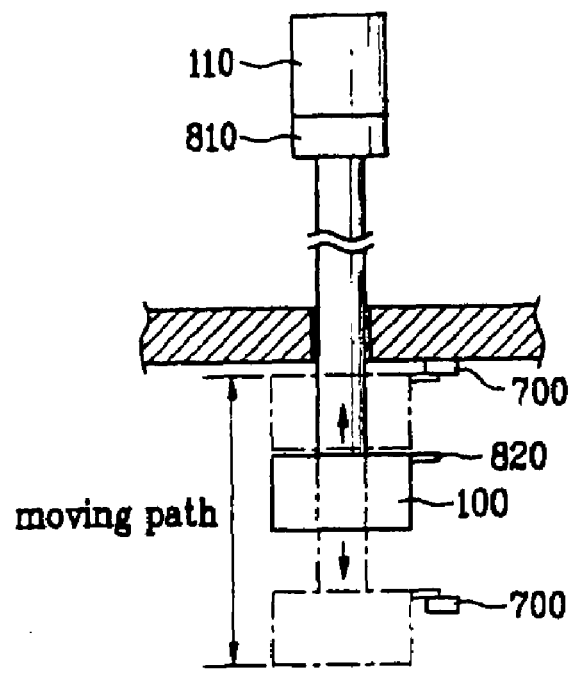
FIG. 9 is an exemplary structure for correction of movement of moving elements in accordance with the present invention.

FIG. 9 is an exemplary structure for correction of movement of moving elements in accordance with the present invention. In FIG. 9, the exemplary structure may include one pair of contact parts 700 in contact with one of moving elements 100, and a contact confirming part attached to the one of the moving elements 100 for sensing contact with the contact part 700. The one pair of contact parts 700 may include one pair of stop blocks. The contact confirming part may include a load cell 810 attached to a driving system 110 for driving each of the moving elements 100, and a contact projection 820 attached to each of the moving elements 100. After moving each of the moving elements 100 from one point to another point, a moving amount verifying system may determine a difference between a moving distance actually performed during the movement, and a preset moving distance. Then, the moving amount verifying system may correct the moving distance by an amount equal to a movement difference during a subsequent movement.

Figure 10A:
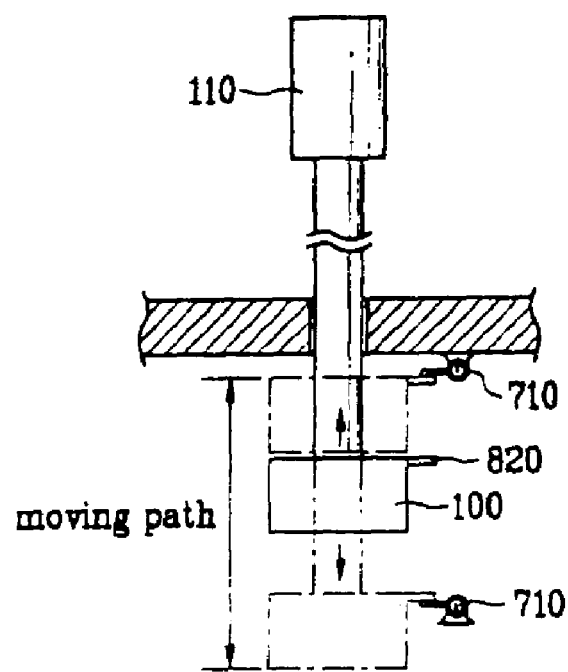
FIGS. 10A to 10C are exemplary fitting states of a movement verifying system employed for movement correction of moving elements in accordance with the present invention.
Figure 10B:
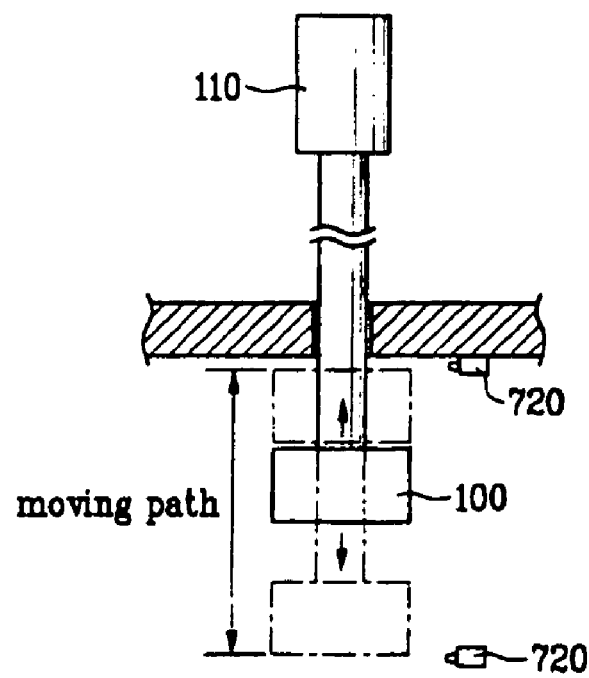
Figure 10C:
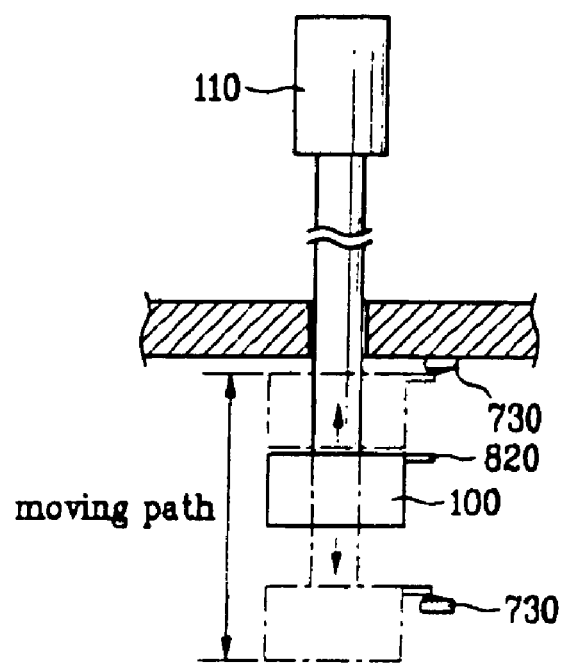

FIGS. 10A to 10C are exemplary fitting states of a movement verifying system employed for movement correction of moving elements in accordance with the present invention. In FIG. 10A, the moving amount verifying system may include dial gauges 710 attached to two ends of a moving path of each of moving elements 100 for contacting the contact projection 820 attached to each of the moving elements 100, thereby reading a moving amount of the moving element 100.

In FIG. 10B, the moving amount verifying system may include position confirming sensors 720 attached to two ends of a moving path of each of the moving elements 100 for reading a moving amount of the moving element 100.

In FIG. 10C, the moving amount verifying system may include limit switches 730 attached to two ends of a moving path of each of the moving elements 100 for reading a moving amount of the moving element 100.

In addition, the moving amount verifying system according to the present invention may include a number of gauges, sensors and/or switches attached to each of the two ends of moving path in correspondence to a number of the moving elements. Alternatively, a number of gauges, sensors and/or switches may be attached to the moving paths of the moving elements 100 that require precise operation.

The moving elements 100 described above may include upper and lower stages, a substrate supporting system, and a loading supporting system. In addition, an alignment system for aligning the substrates, and a clamping system for loading and/or holding the substrates may be provided with the present invention. Moreover, other process supporting systems for supporting various fabrication processes for bonding the substrates may be provided.

Structure and method for correcting a moving amount of an upper stage, substrate supporting system, and/or the loading supporting system 140 will now be explained.

Figure 11:
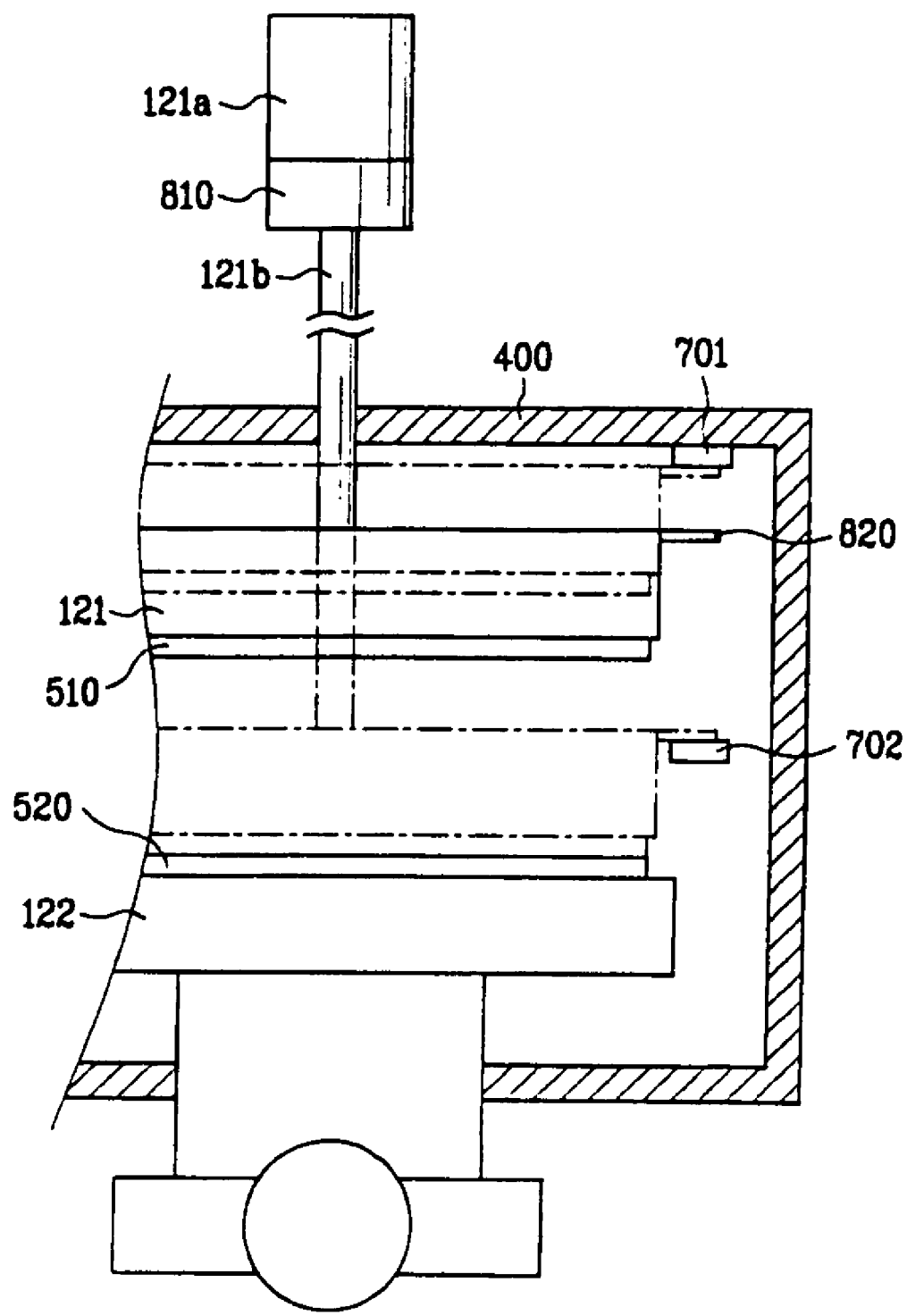
FIG. 11 is an exemplary moving distance setting state of an upper stage in accordance with the present invention.

4. Structure and Method for Correcting a Moving Amount of the Upper Stage:

FIG. 11 is an exemplary moving distance setting state of an upper stage in accordance with the present invention. In FIG. 11, one pair of fourth contact parts 701 and 702 of a moving amount verifying system may be located between a top surface of a lower stage 122 and a top surface of an inside of a chamber part 400 along a moving path of an upper stage 121. The fourth contact parts 701 and 702 may project from an inside surface of the chamber part 400 at both ends of a moving path of the upper stage 121 along a direction toward the upper stage 121. A fourth load cell 810 of the contact confirming part in the moving amount verifying system may be attached to a driving system 121a that moves the upper stage 121 along upward and downward directions.

A fourth contact projection 820 of the contact confirming part may project from a side of the upper stage 121. Accordingly, the fourth contact projection 820 contacts the fourth contact parts 701 and 702 when the upper stage 121 fully moves along the upward or downward direction. Although not shown, an elevating shaft for moving the upper stage 121 along the upward and downward directions may have the pair of fourth contact parts 701 and 702 attached along a moving path of a separate part having a movement similar to the movement of the upper stage 121. In addition, the fourth contact projection 820 contacting the fourth contact parts 701 and 702 may be attached to a part that follows the movement of the upper stage 121, wherein the contact part may be attached to the inside or outside of the chamber part 400.

Steps of an exemplary process for correcting a moving amount of the upper stage by using the foregoing system will now be explained.

Initially, when correcting a moving amount of the upper stage 121 is required, the controller enables the driving system 121a to move the upper stage 121 along the upward direction to one of the upper contact part (i.e., fourth contact parts) 701 of the moving amount verifying system.

During the process, if the fourth contact projection 820 at the side of the upper stage 121 contacts the upper contact part 701 on top of an inside of the chamber part 400, a tensile load is sensed by the fourth load cell 810 at the driving system 121a. Accordingly, the controller stops movement of the upper stage 121 and memorizes the present location of the upper stage 121. Then, the controller enables the driving system 121a into operation to move the upper stage 121 along the downward direction toward the lower contact part (i.e., fourth contact part) 702, when the controller numerically counts a location change of the upper stage 121 starting from an initially memorized location.

During the process, if the fourth contact projection 820 at the side of the upper stage 121 contacts the lower contact part 702 at a lower part of the inside of the chamber part 400, a compressive load is sensed by the fourth load cell 811 at the driving system 121a, whereby the controller stops movement of the upper stage 121.

Next, the controller determines a first distance counted to a first location when movement of the upper stage 121 is stopped, and compares the first distance to a second distance that was ordered to move the upper stage to the first location. Then, the controller reads a difference between the first and second distances. For example, the controller compares an ordered moving distance of the upper stage 121 and an actual moving distance of the upper stage 121 to determine a difference between the ordered and actual moving distances. If a difference between the ordered moving distance and the actual moving distance is within a preset error range, no correction of the moving amount of the upper stage is made.

If the difference between the ordered moving distance and the actual moving distance exceeds the preset error range, the moving amount of the upper stage 121 is reset with reference to information on the actual moving distance of the upper stage 121.

By making real time moving amount correction confirmation of the upper stage 121 available, reliability of the moving amount correction may be improved. In addition, in the foregoing process for correcting the moving distance, the foregoing series of steps may be carried out once, or for a preset number of times, or for a plurality of times until the moving distance is within a tolerable error limit.

In FIG. 10A, during the foregoing series of steps, if one pair of the dial gauges 710 are to read a position of the upper stage 121 to the preset point, an actual moving distance of the upper stage 121 from a first point where a first one of the dial gauges is located to a second point a second one of the dial gauges is located may be determined with reference to a numerical change of the dial gauges 710 attached to the respective preset points. Then, a moving amount of the upper stage 121 may be corrected by comparing the determined actual distance to a preset moving distance.

In FIG. 10B, during the foregoing series of steps, if one pair of the position confirming sensors 720 are to read a position of the upper stage 121 to the preset point, an actual moving distance of the upper stage 121 from a first point of a first one of the sensors is located to a second point of a second one the of the sensors is located is determined with reference to a sensing signal of the sensors 720 fitted to the respective preset points. Then, a moving amount of the upper stage 121 may be corrected by comparing the determined actual distance to a preset moving distance.

In FIG. 10C, during the foregoing series of steps, if one pair of the limit switches 730 are to read a position of the upper stage 121 to the preset point, an actual moving distance of the upper stage 121 from a first point of a first one of the limit switches is located to a second point of a second one of the limit switches is located may be determined with reference to a signal production of the limit switches 730 fitted to the respective preset points. Then, a moving amount of the upper stage 121 may be corrected by comparing the determined actual distance to a preset moving distance.

Figure 12:
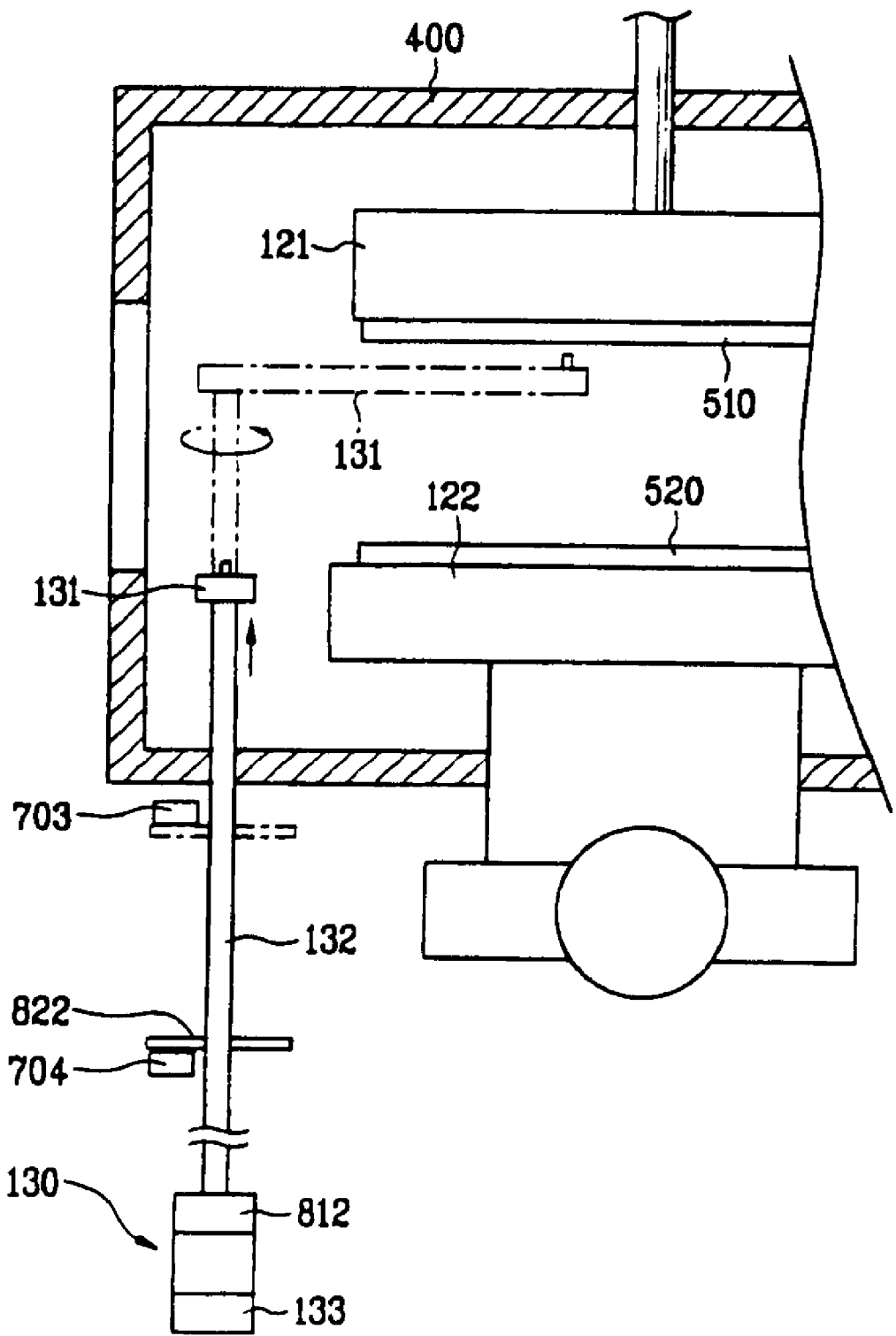
FIG. 12 is an exemplary moving distance setting state of a substrate supporting system in accordance with the present invention.

5. Structure and Method for Correcting a Moving Amount of the Substrate Supporting Means:

FIG. 12 is an exemplary moving distance setting state of a substrate supporting system in accordance with the present invention. In FIG. 12, since a moving path of a substrate supporting system may be within a chamber 400, one pair of fifth contact parts 703 and 704 may be attached to a moving path of an elevating shaft 132 of a substrate supporting system 130 outside of the chamber part 400. Accordingly, the one pair of fifth contact parts 703 and 704 may be prevented from interfering other moving elements. For example, fifth contact projections 822 of the substrate supporting system 130 may be attached to circumferences of the elevating shaft 132 outside of the chamber part 400 so that when the supporting parts 131 of the substrate supporting system 130 are fully moved along an upward or downward direction, the fifth contact projections 822 contact one of the fifth contact parts 703 and 704.

The fifth contact parts 703 and 704 and the fifth contact projection 822 may be respectively attached between a height to a bottom of the substrate 510 held at the upper stage 121 and a height of a location of a bottom of the inside of the chamber part 400 along the moving path of the supporting part 131 of the substrate supporting system 130. Accordingly, the fifth contact parts 703 and 704 and the fifth contact projection 822 may be attached to locations that prevent the fifth contact parts 703 and 704 and the fifth contact projection 822 from interfering with other moving elements. In addition, a fifth load cell 812 of the contact confirming part of the moving amount verifying system may be attached to the driving system 133 to move the substrate supporting system 130 along the upward and downward directions.

An exemplary method for correcting a moving amount of the foregoing substrate supporting system may be performed identical to the series of steps carried out for correction of the moving amount of the upper stage.

Figure 13:
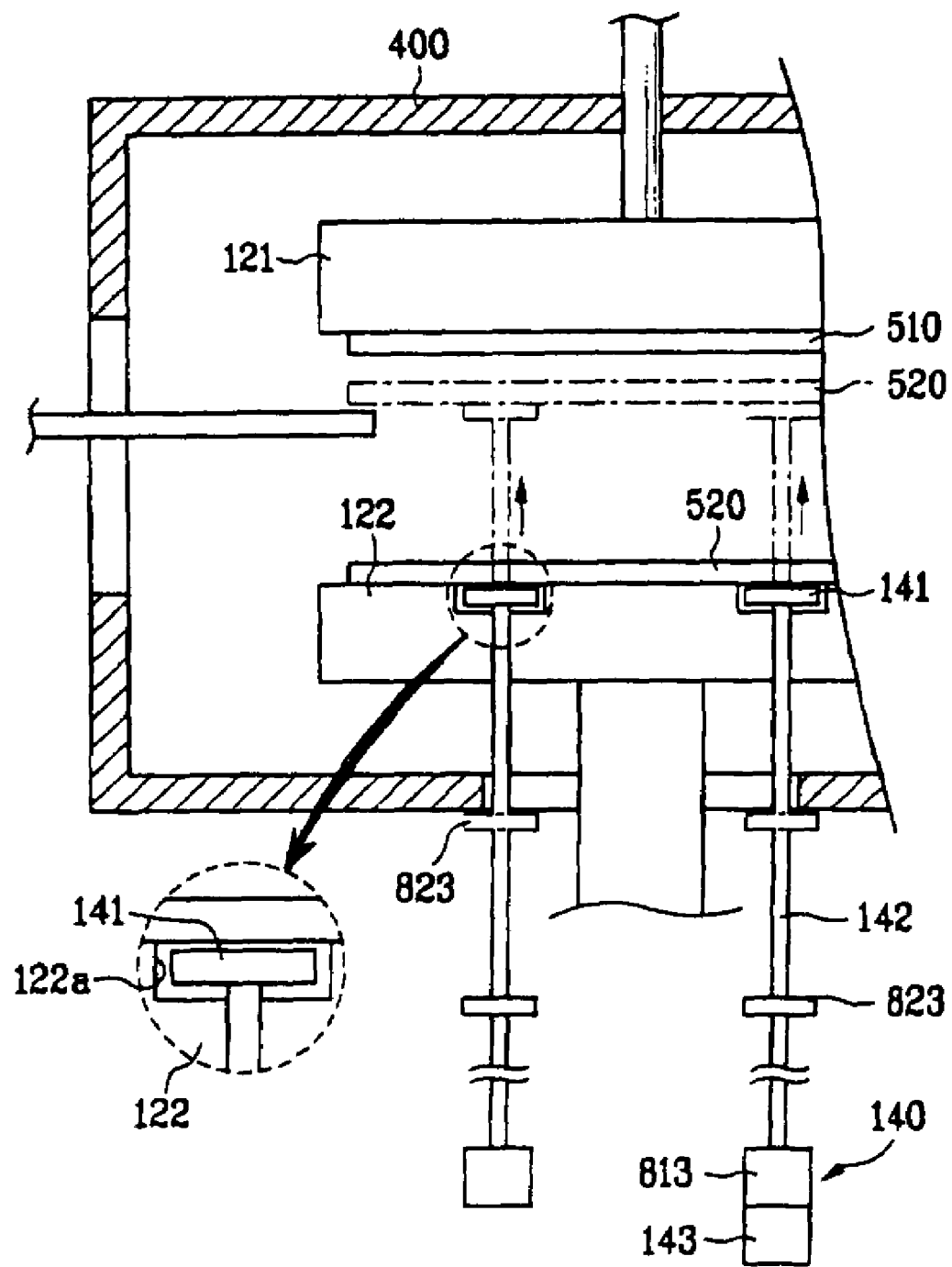
FIG. 13 is an exemplary moving distance setting state of a loading support system in accordance with the present invention.

6. Structure and Method for Correcting a Moving Amount of the Loading Supporting Means:

FIG. 13 is an exemplary moving distance setting state of a loading support system in accordance with the present invention. In FIG. 13, since a moving path of a loading supporting system 140 is on an upper side of a lower stage 122 inside of a chamber part 400, one pair of contact parts may be attached along a moving path of an elevating shaft 142 of the loading supporting system 140 on an outside of the chamber part 400. Accordingly, the contact parts may not interfere with loading of upper and lower substrates 510 and 520. In addition, the one pair of contact parts of the moving amount verifying system may not be attached such that a bottom portion of an outside of the chamber part 400 and a bottom of the recess 122a of the lower stage may serve as the one pair of contact parts. Accordingly, the bottom of the supporting part 141 of the loading supporting system 140 may contact the bottom of the recess 122a of the lower stage 122 to facilitate reading of a required location when the loading supporting system is fully moved along a downward direction.

In addition, a sixth contact projection 823 may be attached to the elevating shaft 142 of the loading supporting system 140 for contacting the bottom of the outside of the chamber part 400 when the loading supporting system 140 is fully moved along the upward direction for reading a required location. Accordingly, the contact parts and the contact projection may respectively be attached between a height of an inside of the recess 122a in the lower stage 122 and a height at which a carrying device is introduced, which is a moving path of the supporting part 141. Alternatively, the contact parts and the contact projection may respectively be fitted at a side of the lower stage 122, which is a part adjacent to a moving path of the loading supporting system 140. Accordingly, the sixth contact projection 823 may be attached to a location at which interference from the different moving elements are avoided. Moreover, a sixth load cell 813 of the contact confirming part of the moving amount verifying system may be attached to the driving system 143 to move the loading supporting system along the upward and downward directions.

An exemplary method for correcting a moving amount by using the foregoing loading supporting system may be performed identical to a series of steps carried out for correction of a moving amount of the upper stage.

The present invention has the following advantages. First, the automatic reset of origins of the different moving elements in the bonding apparatus according to the present invention in an event of unforeseen accident, such as a power outage, allows the controller to continue processing. Second, the origin setting of the different moving elements carried out automatically will provide reliability on the origin setting and the movement of the different moving elements. Third, the detection of operative error of the different moving elements in advance and correction thereof permits stable working processes. Fourth, the automatic origin setting and moving correction of the different moving elements reduces a loss of working time.

It will be apparent to those skilled in the art that various modifications and variations can be made in the LCD device bonding apparatus of the present invention without departing from the spirit or scope of the invention. Thus, it is intended that the present invention cover the modifications and variations of this invention provided they come within the scope of the appended claims and their equivalents.

What is claimed is:

1. A liquid crystal display device bonding apparatus, comprising:
a chamber part for bonding substrates together;
at least one moving element within the chamber part; and
at least one moving amount verifying system attached between at least one end along a moving path of the moving element,
wherein the at least one moving amount verifying system includes one pair of contact parts oppositely attached within the chamber part for contacting the moving element, and a contact confirming part attached to the moving element for sensing contact with the contact parts.

2. The apparatus according to claim 1, wherein the at least one moving amount verifying system is attached between two ends along the moving path of the moving element.

3. The apparatus according to claim 2, wherein the at least one moving amount verifying system includes one pair of dial gauges for sensing contact with the moving element.

4. The apparatus according to claim 2, wherein the at least one moving amount verifying system includes a position confirming sensor for sensing a location of the moving element.

5. The apparatus according to claim 1, wherein the contact confirming part includes a load cell attached to a driving system for driving the moving element.

6. A method for correcting a moving amount in a liquid crystal display device bonding apparatus, comprising the steps of:
moving a moving element from a first set point to a second set point;
confirming a position of the moving element at the first and second set points for reading a position of the moving element to the first and second set points during the moving step;
reading a moving distance of the moving element from the first set point to the second set point;
comparing the read moving distance and a preset moving distance of the moving element for detecting an error between the read moving distance and the present moving distance; and
correcting the moving distance of the moving element based upon the detected error,
wherein the step of confirming a position of the moving element at the first and second set points includes reading an amount of a tensile load along a moving direction of the moving element.

7. The method according to claim 6, wherein the first set point and the second set point during the moving step are at two ends along the moving path of moving element.

8. The method according to claim 6, wherein the step of reading production of a tensile load includes confirming a load change by a load cell attached to the moving element.

9. The method according to claim 6 wherein the step of confirming a position of the moving element at the first and second set points includes confirming occurrence of a numerical change of dial gauges following contact of the moving element with the dial gauges.

10. The method according to claim 6, further comprising the step of sensing a position of the moving element at the first and second set points using a position confirming sensor for reading a position of the moving element at the first and second set point during the moving step.

* * * * *